US008726717B2

(12) United States Patent
Supino et al.

(10) Patent No.: US 8,726,717 B2
(45) Date of Patent: May 20, 2014

(54) ADJUSTING A MEMS GYROSCOPE TO REDUCE THERMALLY VARYING BIAS

(75) Inventors: Ryan Supino, Loretto, MN (US); Howard B. French, Falcon Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 13/316,083

(22) Filed: Dec. 9, 2011

(65) Prior Publication Data
US 2012/0272711 A1    Nov. 1, 2012

Related U.S. Application Data

(60) Provisional application No. 61/479,765, filed on Apr. 27, 2011.

(51) Int. Cl.
*G01P 21/00* (2006.01)

(52) U.S. Cl.
USPC .......................................................... 73/1.77

(58) Field of Classification Search
None
See application file for complete search history.

(56) References Cited

U.S. PATENT DOCUMENTS

| 5,527,003 | A  | 6/1996  | Diesel et al. |
| 5,570,304 | A  | 10/1996 | Mark et al.   |
| 7,120,548 | B2 | 10/2006 | Malvern       |
| 7,877,887 | B2 | 2/2011  | Watson        |
| 2008/0000296 | A1 | 1/2008  | Johnson    |
| 2010/0218606 | A1 | 9/2010  | Fell        |
| 2010/0251817 | A1 | 10/2010 | Ge et al.   |

FOREIGN PATENT DOCUMENTS

| EP | 2098823     | 9/2009  |
| KR | 20030084386 | 11/2003 |
| WO | 03014669    | 2/2003  |

OTHER PUBLICATIONS

European Patent Office, "Office Action", "from Foreign Counterpart of U.S. Appl. No. 13/316,083", Apr. 2, 2013, pp. 1-5, Published in: EP.

European Patent Office, "European Search Report", "from Foreign Counterpart of U.S. Appl. No. 13/316,083", Oct. 15, 2012, pp. 1-3, Published in: EP.

Xu et al., "Temperature drift modelling and compensation for a dynamically tuned gyroscope by combining WT and SVM method", "Measurement Science and Technology", Mar. 20, 2007, pp. 1425-1432, vol. 18, Publisher: IOP Publishing Ltd.

*Primary Examiner* — Robert R Raevis
(74) *Attorney, Agent, or Firm* — Fogg & Powers LLC

(57) ABSTRACT

A method for calibrating a micro-electro-mechanical system (MEMS) vibrating structure gyroscope is provided. The method includes obtaining an indication of a position of at least one proof mass with respect to at least one drive electrode and applying an electrostatic force to the at least one proof mass as a function of the indication, the electrostatic force configured to position the at least one proof mass in a first position with respect to at least one drive electrode.

19 Claims, 8 Drawing Sheets

ADJUSTING A MEMS GYROSCOPE TO REDUCE THERMALLY VARYING BIAS

This application claims the benefit of U.S. Provisional Application No. 61/479,765, filed on Apr. 27, 2011, which is incorporated herein by reference in its entirety.

BACKGROUND

A micro-electro-mechanical system (MEMS) gyroscope can have a bias that is a function of temperature (e.g., a thermally varying bias). This bias can limit performance especially when large temperature changes or thermal gradients are present. Typically, thermally varying bias is compensated for by software post processing that adjusts an output signal based on modeling and empirical data.

SUMMARY

The present application relates to a method for calibrating a micro-electro-mechanical system (MEMS) vibrating structure gyroscope. The method includes obtaining an indication of a position of at least one proof mass with respect to at least one drive electrode and applying an electrostatic force to the at least one proof mass as a function of the indication, the electrostatic force configured to position the at least one proof mass in a first position with respect to at least one drive electrode.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Embodiments described herein relate to a method and system for adjusting a vibratory structure gyroscope to reduce a thermally varying bias. For an electrostatically driven in-plane gyroscope, a large contributor to a thermally varying bias is out-of-plane drive forces generated by a drive comb. These out-of-plane forces arise when the drive comb is not aligned (e.g., completely engaged) with the corresponding comb on the proof mass. This lack of alignment can cause asymmetrical electrostatic fringe fields which apply a net force on the proof mass. The net force can induce time varying motion of the proof mass along the sense axis at the motor frequency. Since the drive voltage is a function of temperature, the net force on the proof mass is also a function of temperature. This motion results in a bias sensed by the sense electrodes that is a function of temperature. Accordingly, embodiments described herein can apply an electrostatic force to the proof mass in order to align the comb(s) of the proof mass with the comb(s) of the drive electrode.

Figure 1:
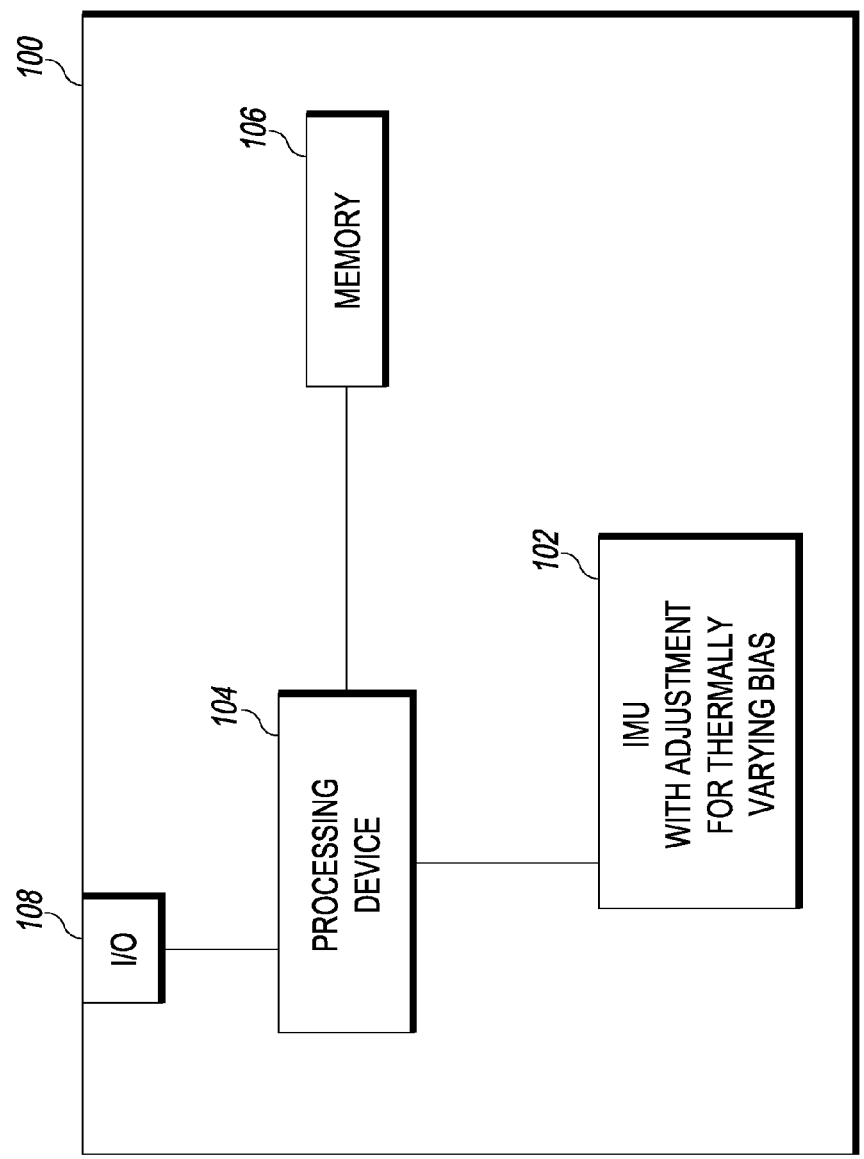
FIG. 1 is a block diagram of an example of a system including an inertial measurement unit (IMU) having a gyroscope that can be adjusted to reduce a thermally varying bias.

FIG. 1 is a block diagram of an example of a system 100 including an inertial measurement unit (IMU) 102 having a gyroscope that can be adjusted to reduce a thermally varying bias. The system 100 can include one or more processing devices 104 coupled to one or more memory devices 106 and the IMU 102. The one or more memory devices can include instructions which, when executed by the one or more processing devices 104, cause the one or more processing devices 104 to perform one or more acts. In an example, the system 100 is configured as a navigation system and the instructions include instructions to perform navigation procedures including calculating a navigation solution which can be provided to other devices via an input/output port 108. For example, the one or more processing devices 104 can calculate a navigation solution based on inertial measurement data obtained by and received from the IMU 102.

In an example, the one or more processing devices 104 can include a central processing unit (CPU), microcontroller, microprocessor (e.g., a digital signal processor (DSP)), field programmable gate array (FPGA), application specific integrated circuit (ASIC), or other processing device. The one or more memory devices 106 can include any appropriate processor readable medium used for storage of processor readable instructions or data structures. Suitable processor readable media can include tangible media such as magnetic or optical media. For example, tangible media can include a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link.

The IMU 102 can be configured to make an adjustment to reduce a thermally varying bias. In an example, the adjustment can be performed as, or part of, a calibration procedure for the IMU 102. For example, upon a start-up of the system 100, the one or more processors 104 can send a signal to the IMU 102 indicating a start-up. In other examples, the IMU 102 can self recognize start-up based on, for example, power up of the system 100. In any case, upon receiving the signal from the one or more processors 104, or otherwise recognizing start-up, the IMU 102 can perform a calibration procedure including adjustment to reduce a thermally varying bias. In some examples, the IMU 102 can perform the calibration procedure during a pause in operation of the IMU 102. For example, the IMU 102 after start-up and during operation can pause operation to perform the calibration procedure. In some examples, the IMU 102 can periodically perform the calibration procedure (e.g., by periodically pausing during operation). In still other examples, the IMU 102 can perform the calibration in the factory prior to being shipped to the consumer. In any case, the IMU 102 can perform a calibration procedure including an adjustment to reduce a thermally varying bias in order to improve performance thereof.

Figure 2:
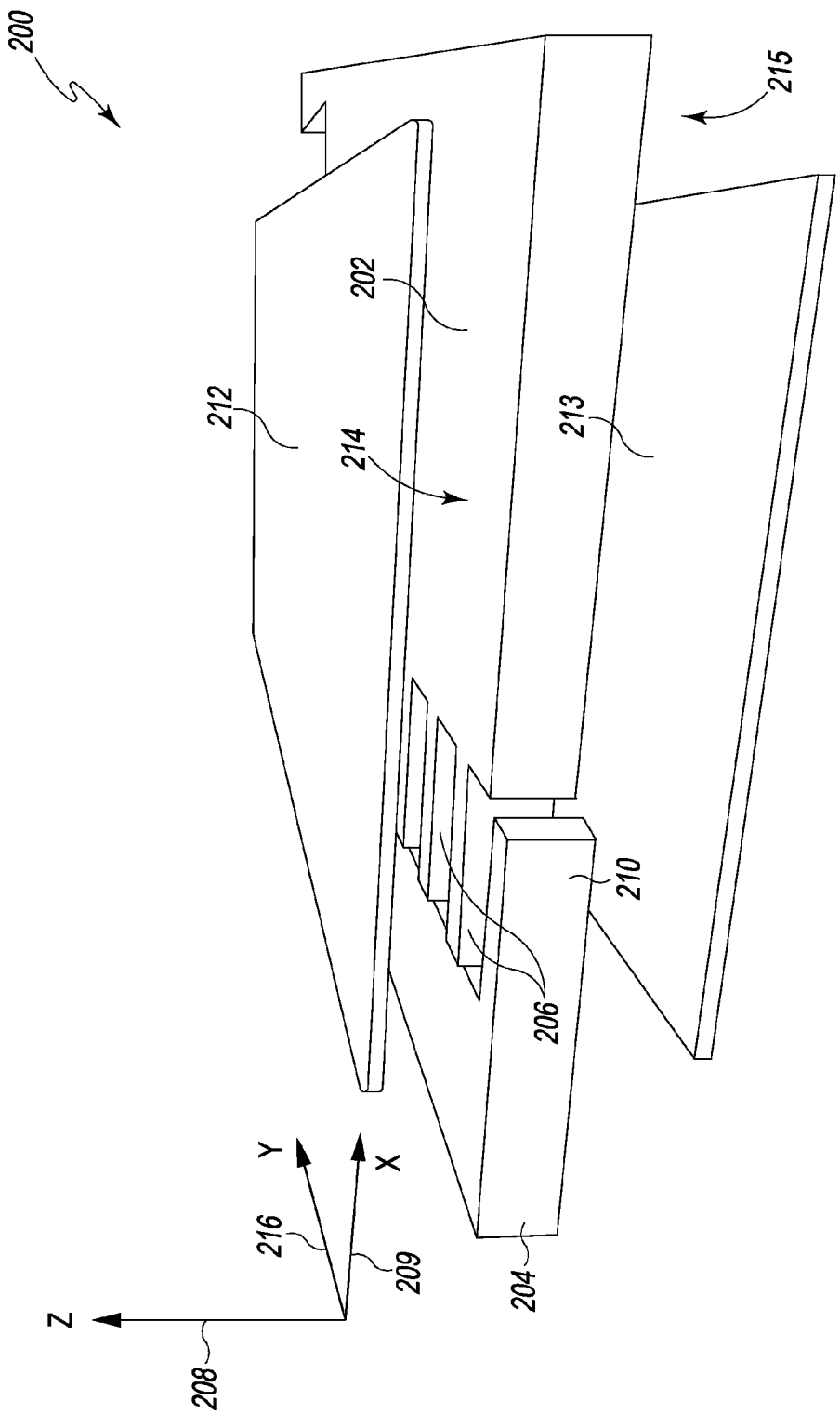
FIG. 2 is a perspective view of an example of a vibratory structure gyroscope such as the gyroscope in the IMU of FIG. 1.

FIG. 2 is a perspective view of an example of a vibratory structure gyroscope 200 such as the gyroscope in the IMU 102 that can make an adjustment to reduce a thermally varying bias. The gyroscope 200 can include at least one proof mass 202 (also referred to herein simply as "proof mass 202") that is configured to move according to a Coriolis Effect. The gyroscope 200 can also include at least one drive electrode 204 (also referred to herein simply as "drive electrode 204") configured to apply a drive force to the proof mass 202. The proof mass 202 can comprise a generally planar structure having at least one comb 206 (also referred to herein as "proof mass comb 206") on one or more edges of the planar structure. In an example, the proof mass 202 can be configured as an "in-plane" sensor such that a Coriolis Effect moves the proof mass 206 in a direction normal to the planar structure; that is, a sense axis (Z) 208 of the proof mass 202 is normal to the planar structure.

The drive electrode 204 can also include at least one comb 210 (also referred to herein as "drive comb 210") that is configured to engage with the proof mass comb 206 and is configured to apply the drive force to the proof mass comb 206. The gyroscope 200 can also include a first sense electrode 212 and a second sense electrode 213 that can be used to determine motion along the sense axis 208 of the proof mass 202. The proof mass 202 can be disposed between the sense electrodes 212, 213, such that the sense electrodes 212, 213 are disposed opposing respective planar sides 214, 215 of the proof mass 202.

In an example, motion along the sense axis 208 can be determined by configuring the sense electrodes 212, 213 to apply an electrostatic field (also referred to herein as a "sense field") around the proof mass 202 and by sensing a change in voltage of the proof mass 202 caused by the motion of the proof mass 202 within the sense field. For example, as the proof mass 202 (having a given DC potential) moves along the sense axis 208, a charge induced on the proof mass from the sense field can be sensed and used to determine the magnitude of the motion along the sense axis. In other examples, the motion of the proof mass 202 can be determined in other manners including measuring an AC signal induced on the sense electrodes 212, 213.

Figure 3:
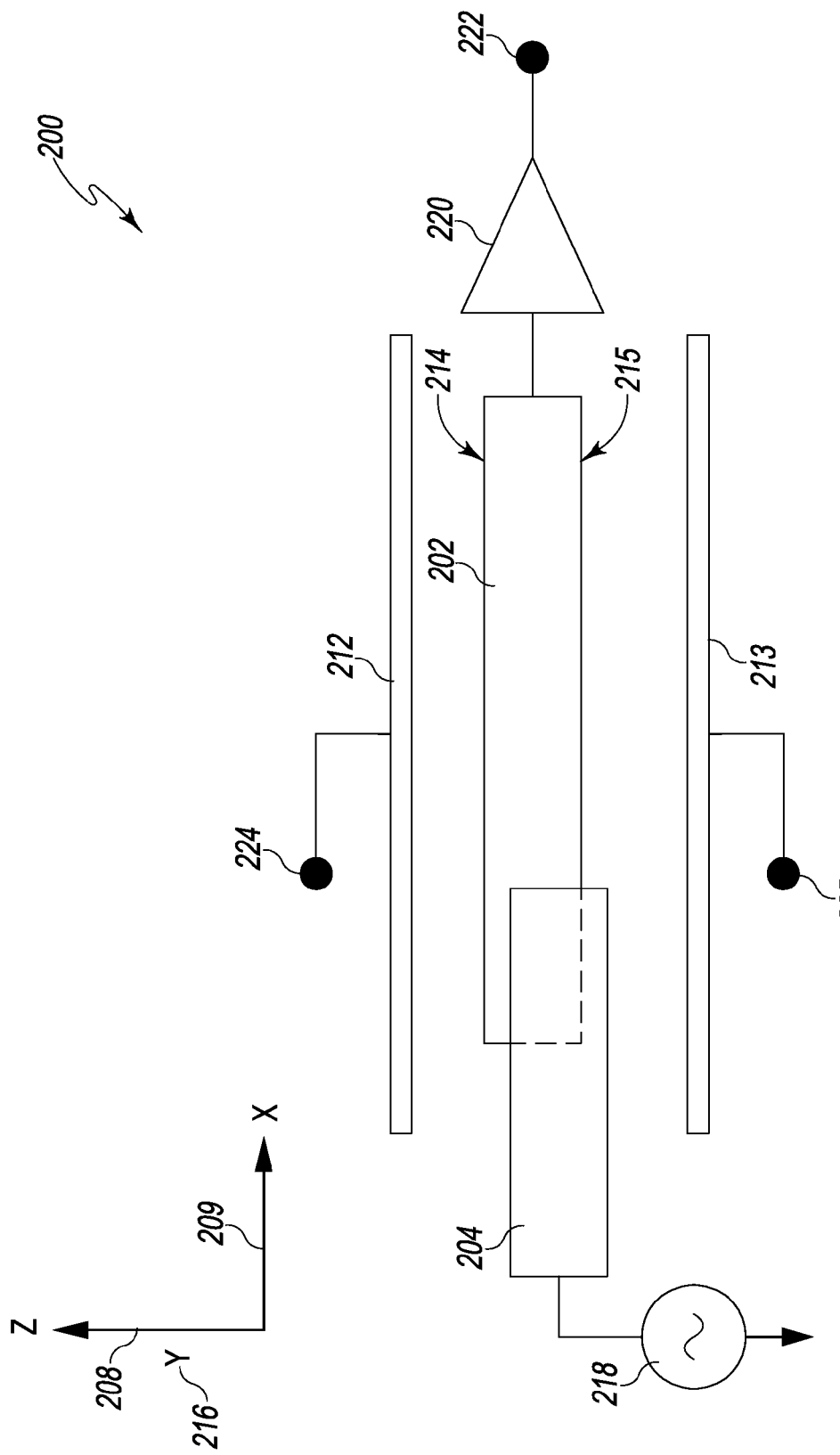
FIG. 3 is a side view/block diagram of the vibratory structure gyroscope of FIG. 2.

FIG. 3 is a side view/block diagram of the vibratory structure gyroscope 200. As shown, a signal generator 218 can provide a drive signal to the drive electrode 204 and a sense pickoff can be obtained from an output 222 of an amplifier 220 (e.g., a charge amplifier) that is coupled to the proof mass 202. A sense field can be applied to the proof mass 202 by the first sense electrode 212 and the second sense electrode 213 by applying appropriate voltages to the inputs 224, 225.

In operation, a drive signal is generated by the signal generator 218 and applied to the drive electrode 204. Applying drive signal to the drive electrode 204 can cause the drive comb 210 to apply a corresponding drive force to the proof mass comb 206. This drive force can cause the proof mass 202 to oscillate along the drive (X) axis 209. Rotation about the input (Y) axis 216 during the drive force induced oscillation can cause the proof mass 202 to oscillate at the motor frequency (two times the frequency of the drive signal) along the sense (Z) axis 208 according to the Coriolis Effect. This oscillation along the sense axis 208 results in the proof mass 202 moving closer to and farther, respectively, the sense electrodes 212, 213. This oscillation by the proof mass 202 can be sensed at the output 222 based the current induced in the proof mass 202 by the sense field produced by the sense electrodes 212, 213.

Figure 4:
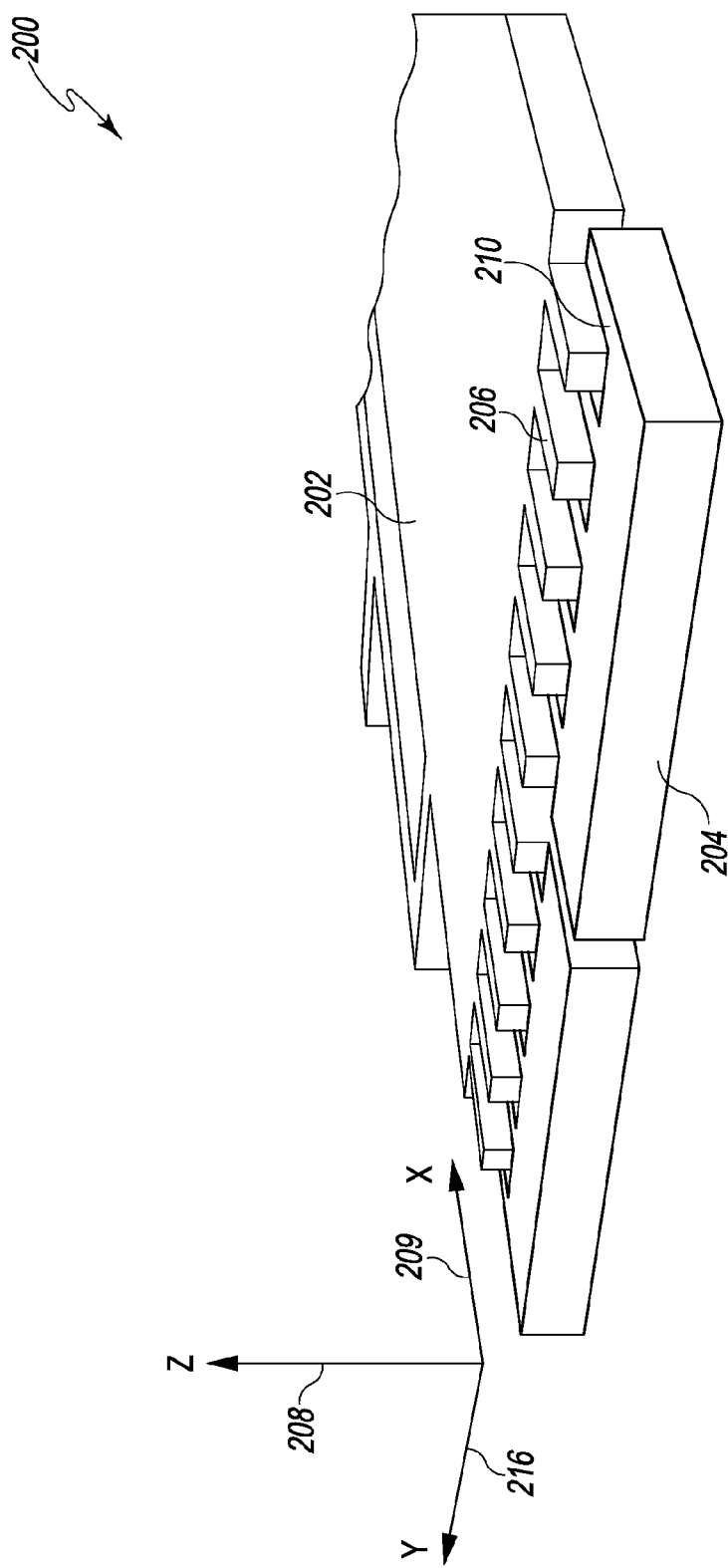
FIG. 4 is a perspective view of an example of a portion of the gyroscope of FIG. 2 showing an offset of a proof mass comb with respect to a drive comb.

FIG. 4 is a perspective view of a portion of the gyroscope 200 showing a proof mass 202, a drive electrode 204, and their respective combs 206, 210. FIG. 4 illustrates the proof mass comb 206 offset (e.g., partially disengaged) from the drive comb 210 along the sense axis 208. The offset can be caused by deformities and/or stress in the drive comb 210 and/or the proof mass comb 206 during fabrication.

Figure 5:
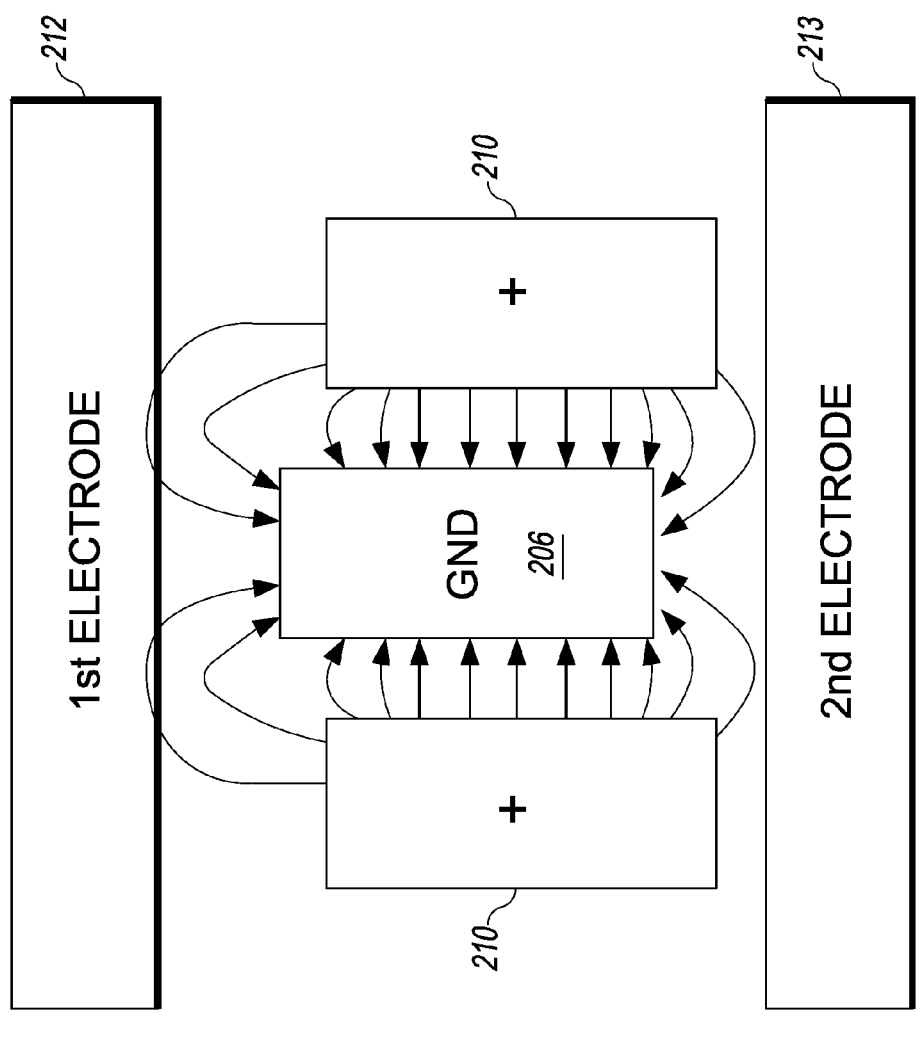
FIG. 5 is a cross sectional view of an example of the gyroscope of FIG. 2 showing an offset of a proof mass comb with respect to a drive comb.

FIG. 5 is a cross-sectional view of the gyroscope 200 showing the offset of the proof mass comb 206 with respect to the drive comb 210. As shown, this offset can cause an asymmetric "fringe" electric field to be applied to the proof mass comb 206 by the drive comb 210 when a drive force is applied. The asymmetric electric field causes a net force to be applied by the drive comb 210 along the sense axis 208. Since the drive force applied by the drive comb 210 is alternating, the net force results in an oscillation along the sense axis 208 of the proof mass 206 with respect to the drive comb 210. Moreover, this oscillation can occur at the same frequency that a rotation signal would appear, the motor frequency. Thus, this oscillation can be sensed as a false rotation signal (e.g., bias). Additionally, as mentioned above, since the strength of the asymmetric electric field is based on the drive force applied by the drive comb 210, which is a function of temperature, the offset is also a function of temperature resulting in a thermally varying bias.

In order to adjust the gyroscope 200 to reduce the thermally varying bias the gyroscope 200 can be configured to apply an electrostatic force to the proof mass 202 to place the proof mass 202 in a position that produces a desired (e.g., minimal) thermally varying bias. In particular, the electrostatic force can be configured to adjust a position of the proof mass comb 206 with respect to the position of the drive comb 210 along the sense axis 208. In an example, the electrostatic force can be configured to align the proof mass comb 206 with the drive comb 210. In an example, the gyroscope 200 can include a control circuit configured to determine an electrostatic force and apply the electrostatic force to the proof mass 202.

As mentioned above, an electrostatic force can be applied to the proof mass 202 to adjust its position. In an example, the electrostatic force can be applied by two or more electrodes opposing respective planar sides 214, 215 of the proof mass 202. The electrostatic force can be produced by applying appropriate direct current (DC) voltages to the two or more electrodes to produce the electrostatic force on the proof mass 202. In particular, the DC voltage applied to the two or more electrodes is configured relative to the voltage of the proof mass 202 to produce the force. For example, if a positive DC voltage is applied to a first electrode above the proof mass 202 and a negative DC voltage is applied to a second electrode below the proof mass 202, the values of the positive and negative voltages can be set based on the voltage of the proof mass 202 to produce the force. For example, if the proof mass 202 is at DC ground potential (0v) and the first and second electrodes are at equal distances from the proof mass 202, an electrostatic force can be applied in an upward direction by setting the positive voltage applied to the first electrode at a relative value that is larger than the negative voltage applied to the second electrode. For example, an upward force can be applied by applying +6 volts to the first electrode and −4 volts to the second electrode. Since the proof mass 202 is at 0 volts, these voltages applied to the first and second electrodes will produce an electrostatic force on the proof mass towards the first electrode. In this manner, the amount and direction of the electrostatic force applied to the proof mass 202 can be set by applying the appropriate voltages to the first and second electrodes. In an example, the two or more electrodes used to apply the electrostatic force can comprise the sense electrodes 212, 213. Accordingly, appropriate DC voltages can be applied to the sense electrodes 212, 213 to adjust a position of the proof mass comb 206 with respect to the drive comb 210 along the sense axis 208. As explained in more detail below, the voltages applied to the sense electrodes 212, 213 can be selected in order to provide (e.g., maintain) a desired scale factor. In other examples, dedicated electrodes (i.e., electrodes other than the sense electrodes 212, 213) can be used to apply the electrostatic force.

Figure 6:
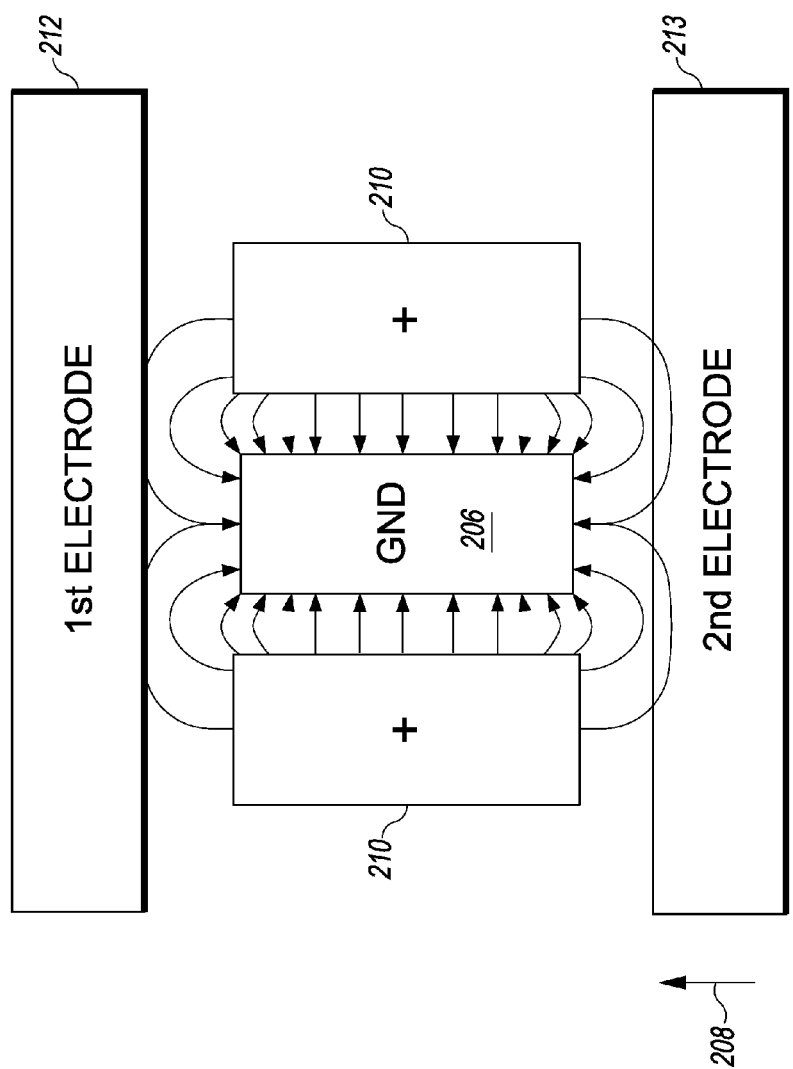
FIG. 6 is a cross sectional view of an example of the gyroscope of FIG. 2 showing a proof mass comb aligned with a drive comb.

FIG. 6 is a cross sectional view of the gyroscope 200 showing the proof mass comb 206 aligned with the drive comb 210. By controlling the DC voltages of the sense electrodes 212, 213 relative to the proof mass 202, an electrostatic force can be applied to the proof mass 202 to move the proof mass toward either sense electrode 212 or sense electrode 213. Adjusting the position of the proof mass comb 206 along the sense axis 208 can reduce the asymmetry of the electric field, and therefore reduce the net force along the sense axis 208.

Figure 7:
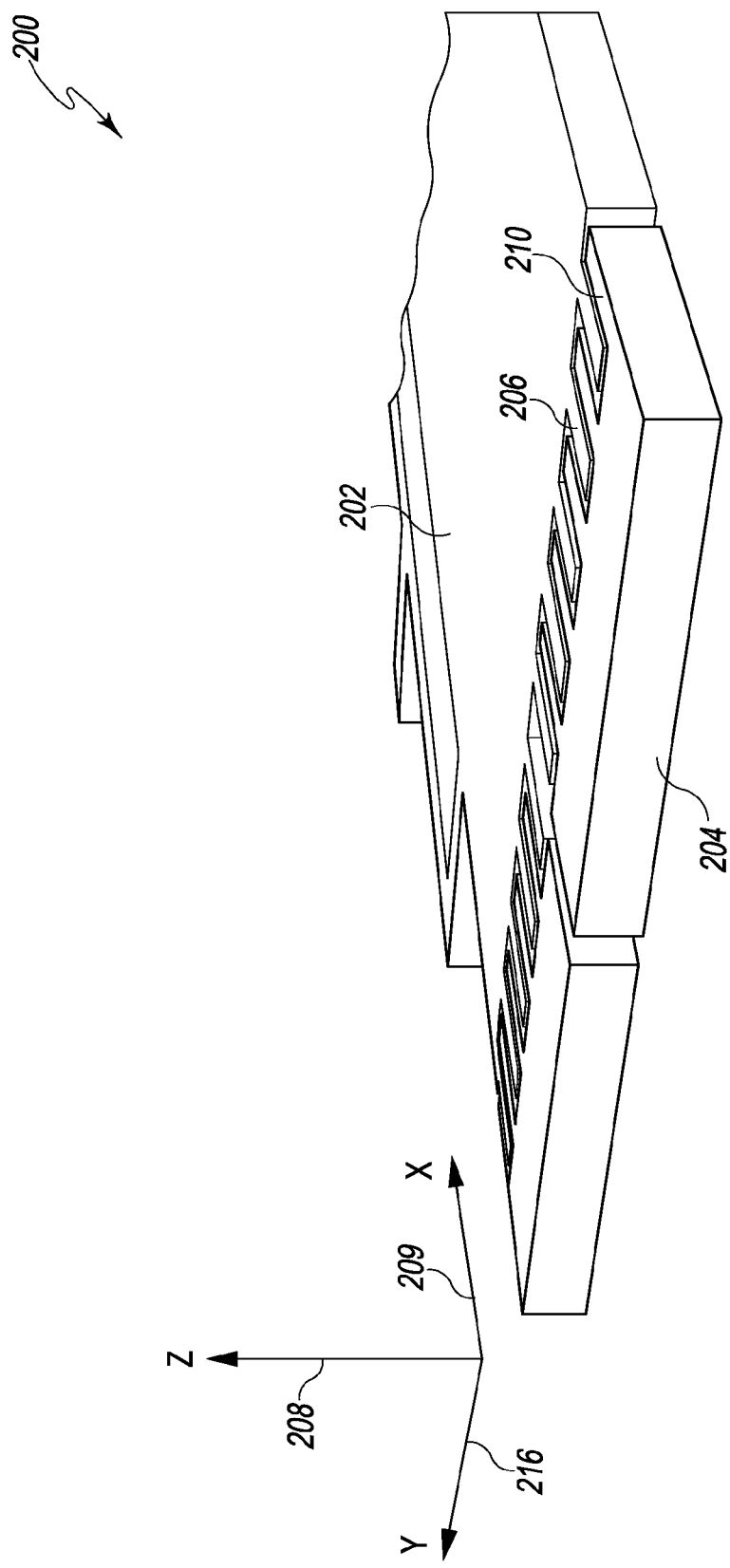
FIG. 7 is a perspective view of an example of a portion of the gyroscope of FIG. 2 showing a proof mass comb aligned with a drive comb.

FIG. 7 is a perspective view of a portion of the gyroscope 200 showing the proof mass 202 and the drive electrode 204 with their respective combs 206, 210 aligned.

Figure 8:
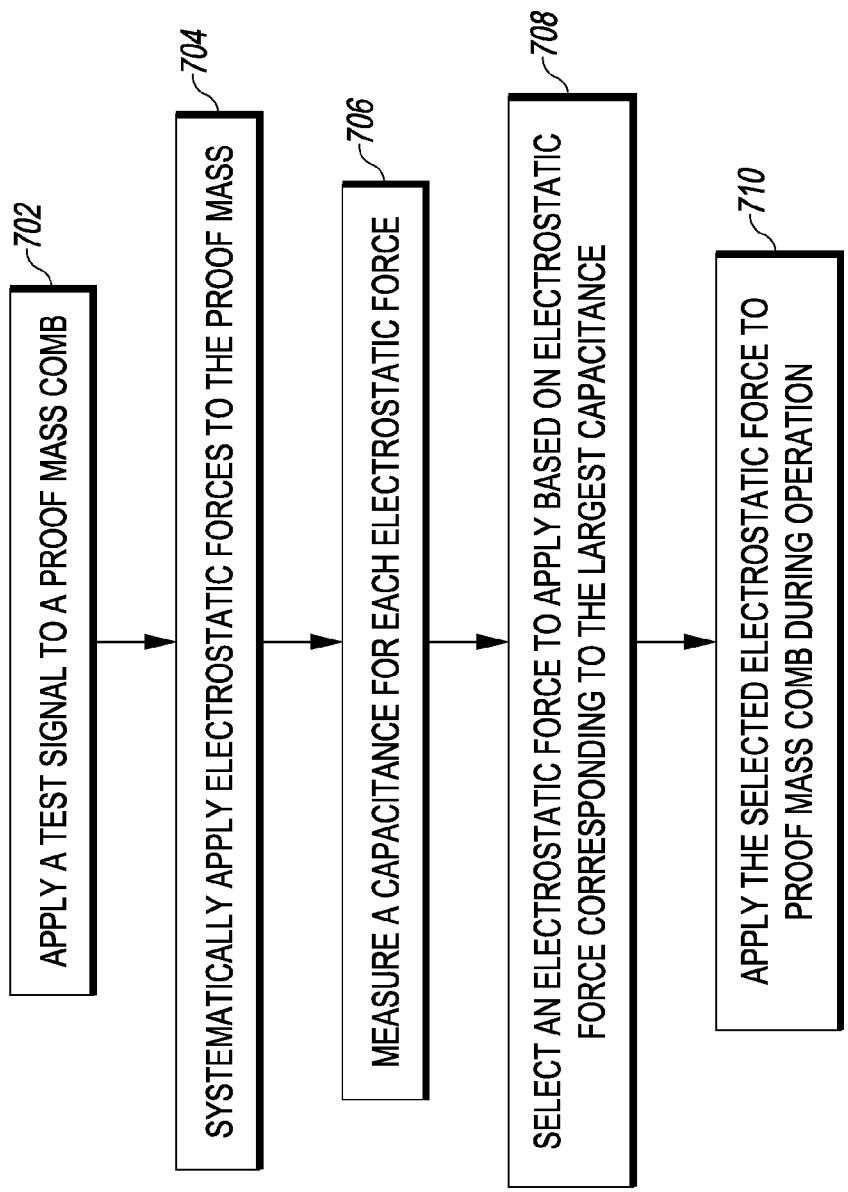
FIG. 8 is a flow diagram of an example method to adjust the gyroscope of FIG. 2 to reduce a thermally varying bias.

FIG. 8 is a flow diagram of an example method 700 to adjust the gyroscope 200 to reduce a thermally varying bias. In order to adjust the proof mass comb 206, an amount of electrostatic force to be applied to the proof mass 202 can be determined. An amount of electrostatic force can be determined by obtaining an indication of a position of the proof mass comb 206 along a sense axis 208 with respect to the drive comb 210. As a function of the indication of position, an electrostatic force can be applied to the proof mass 202 to position the proof mass 202 as desired.

In an example, the amount of electrostatic force to apply for a given position of the proof mass comb 206 can be based on empirical evidence. For example, a table can be referenced to link the particular position of the proof mass comb 206 with an electrostatic force to be applied.

In another example, an amount of electrostatic force to apply can be determined by systematically applying different test electrostatic forces to the proof mass 202 and obtaining indications of the position of the proof mass comb 206 with respect to the drive comb 210 for the different test electrostatic forces. Then, the test electrostatic force corresponding to the most desirable position can be selected and applied to the proof mass 202 during operation of the gyroscope.

The indication of position of the proof mass comb 206 with respect to the drive comb 210 can be obtained in different manners. In one example, an indication of a position of the proof mass comb 206 with respect to the drive comb 210 can be obtained by applying a test signal to the proof mass 202 (block 702 of FIG. 8) and measuring a capacitance between the drive electrode 204 and the proof mass 202. The test signal can be an alternating current (AC) signal set at a frequency away from a resonant frequency of the proof mass 202 such that the test signal induces little or no motion in the proof mass 202. That is, the test signal can have a frequency that limits motion of the proof mass 202. In an example, the resonant frequency of the proof mass 202 can be 10 kHz and the test signal can be applied at 20-30 kHz.

While the test signal is applied a capacitance between the drive electrode 204 and the proof mass 202 corresponds to the amount of engagement between the drive comb 210 and the proof mass comb 206. In particular, the farther away the proof mass comb 206 is from the drive comb 210, the smaller the capacitance. Accordingly, a larger capacitance corresponds to a more engaged proof mass comb 206 with drive comb 210. The capacitance can be measured by demodulating a signal from the output 222 of the amplifier 220 at the frequency of the test signal. In particular, the current induced in the proof mass 202 by the drive force can be equal to the capacitance times the time derivative of the AC voltage of the drive signal. Accordingly, the capacitance can be obtained based on the signal at the output 222 and the AC voltage of the drive signal.

In an example, a plurality of different test electrostatic forces can be applied to the proof mass 202 (block 704 of FIG. 8) and a plurality of indications of the position of the proof mass comb 206 with respect to the drive comb 210 can be obtained by measuring a plurality of capacitances between the drive electrode 204 and the proof mass 202 for the different test electrostatic forces (block 706 of FIG. 8). Then, the test electrostatic force corresponding to the most desirable position can be selected and applied to the proof mass 202 during operation (block 708 of FIG. 8). In an example, the most desirable position corresponds to the test electrostatic force having the largest capacitance. Accordingly, the test electrostatic force corresponding to the largest capacitance can be selected and applied during operation of the gyroscope 200 (block 710 of FIG. 8).

In another example, the indication of a position of the proof mass comb 206 with respect to the drive comb 210 can be obtained based on a bias decomposition at the sense output of the gyroscope 200. The bias decomposition can include at least four measurements. These four measurements can be used to estimate the bias at the sense output that is attributable to the disengagement of the proof mass comb 206 with respect to the drive comb 210. This bias at the sense output is referred to herein as the motion driven (MD) bias.

The four measurements include 1) a measurement with a drive signal applied and a sense field applied, 2) a measurement without a drive signal applied and with the sense field applied, 3) a measurement with a drive signal applied and with either no sense field applied or an inverse of the sense field applied in 1), and 4) a measurement without the drive signal applied and with either no sense field applied or an inverse of the sense field applied in 1).

For example, a drive signal can be applied to the at least one proof mass. As should be understood a drive is configured to resonate the proof mass 202 as opposed to the test signal described above which is configured to not resonate the proof mass 202. Thus, a drive signal can have a frequency that corresponds to the resonant frequency of the proof mass 202.

The first 1) measurement described above is obtained while a drive signal is applied and while a sense field is applied. This first measurement would include a bias (also referred to herein as "Electric Natural" or "EN" bias) caused by a natural (not drive signal induced) electric phenomenon+bias (also referred to herein as "Electric Driven" or "ED" bias) caused by unintended electrical signals induced by the drive signal+bias (also referred to herein as "Motion Driven" or "MD" bias) caused by drive motion induced signals+bias (also referred to herein as "Motion Natural" or "MN" bias) caused by natural (not drive signal induced) motion. The other three (or more) measurements can eliminate or invert one or more of the above biases such that the MD bias can be isolated.

The second 2) measurement described above is obtained without a drive signal applied and with the sense field applied. This second measurement would include the EN bias+the MN bias.

The third 3) and fourth 4) measurements can be obtained with either the sense field inverted with respect to the sense field in the first and second measurements or with no sense field applied. Accordingly, the third 3) measurement can be obtained while a drive signal is applied and without a sense field applied. This third measurement would include the EN bias+the ED bias. A fourth 4) measurement can be obtained without a drive signal applied and without a sense field applied. This fourth measurement would include the EN bias.

In an alternative example, the third 3) measurement can be obtained while a drive signal is applied and with a sense field applied that is inverse of the sense field applied during the first 1) and second measurements 2). A sense field that is inverse of the sense field applied during the first 1) and second measurements 2) can be generated by, for example, reversing the polarity of the voltages applied to the sense electrodes 212, 213 (e.g., from +5 on the first sense electrode 212 and −5 on the second sense electrode 213 to −5 on the first sense electrode 212 and +5 on the second sense electrode 213). This alternative third measurement would include the EN bias+the ED bias−the MN bias−the MD bias. The fourth 4) measurement can be obtained without a drive signal applied and with an inverse sense field applied. This alternative fourth measurement would include the EN bias−the MN bias. In yet another example, the alternative third and/or alternative fourth measurement can be obtained in addition to one or both of the (original) third and (original) fourth measurements.

Measurements taken without the drive signal applied can be taken while the proof mass 202 is ringing down after a drive signal has been applied. That is, immediately after a drive signal is stopped, the proof mass 202 will continue to oscillate with decreasing amplitude for a period of time. During this period of time a signal based on the oscillation can be obtained at the sense output. Since the proof mass 202 is oscillating without the drive signal applied, the motion of the proof mass 202 is, ideally, not based on forced induced via the drive signal. Accordingly, bias measurements taken during this time do not include drive signal induced components (e.g., ED and MD bias). These measurements can be taken with the proof mass 202 at a similar amplitude to the amplitude of the proof mass 202 when the drive signal is applied. To take these measurements at a similar amplitude the amplitude of the proof mass 202 can be increased above its amplitude for a normal drive signal and then the drive signal can be stopped. As the proof mass 202 rings down the proof mass 202 oscillations decrease in amplitude. When the oscillations are approximately the same amplitude as during a normal drive signal, the measurements can be taken.

In any case, from these four or more measurements the MD bias can be obtained, and a MD bias can be determined based thereon. In some examples, the above bias decomposition can be repeated for a plurality of different test electrostatic forces. Then, the test electrostatic force corresponding to the smallest MD bias can then be selected and applied to the proof mass 202 during operation of the gyroscope 200.

In examples where the electrostatic force is applied via two or more electrodes (e.g., the sense electrodes 212, 213) opposing respective planar sides 214, 215 of the proof mass 202, the different test electrostatic forces can be applied by applying different test DC voltages (e.g., by the control circuit) to the two or more electrodes. Moreover, the DC voltages applied to the sense electrodes 212, 213 can take into account a scale factor. That is, the DC voltages applied to the sense electrodes 212, 213 can provide a desired voltage differential between the first sense electrode 212, 213 as well as providing a net electrostatic force, with respect to ground (0 volts), in one direction. To provide a net electrostatic force, with respect to ground, while providing a desired scale factor, the voltage applied to each electrode 212, 213 can be set such that a desired voltage differential between the first and second sense electrode 212, 213 is achieved.

The following is an example of systematically applying test DC voltages while maintaining a 10v differential (for scale factor) between the electrodes 212, 213: First 1) +3 volts can be applied the first sense electrode 212 and −7 volts to the second sense electrode 213; second 2) +4 volts can be applied to the first sense electrode 212 and −6 volts to the second sense electrode 213; third 3) +5 volts can be applied to the first sense electrode 212 and −5 volts to the second sense electrode 213; fourth 4) +6 volts can be applied to the first sense electrode 212 and −4 volts to the second sense electrode 213; and fifth 5) +7 volts can be applied to the first sense electrode 212 and −3 volts to the second sense electrode 213. Other methods of systematically applying test DC voltages to sense electrodes 212 and 213 are possible.

In an example, the electrostatic force applied to the proof mass 202 can vary across the proof mass 202 to provide more or less force on a given area. This can be used when the proof mass 202 has multiple combs 206 which have different offsets with respect to their corresponding drive combs 210. For example, the at least one comb 206 of the proof mass 202 can include a first comb and a second comb, and the at least one comb 210 of the drive electrode 204 can include a third comb and a fourth comb. The third comb can be configured to engage with and apply a drive signal to the first comb and the fourth comb can be configured to engage with and apply a drive signal to the second comb. A first electrostatic force can be applied to a first comb 206, and a second electrostatic force can be applied to a second comb 206. Accordingly, the combs 206 of the proof mass 202 can be individually adjusted based on different offsets for different combs 206.

In a particular example, different combs 206 (e.g., a first and second comb) of the proof mass can be individually adjusted. To individually adjust different combs 206, each comb 206 can be tested individually by applying a test drive signal to that particular comb, and not to other combs 206. For example, to determine an amount of electrostatic force to be applied to a first comb 206 a test drive signal can be applied to the first comb 206 of the proof mass 202, but not to a second comb 206. The amount of electrostatic force to be applied can then be determined based on an indication of a position of the first comb 206 along a sense axis 208 with respect to a corresponding third drive comb 210. Likewise, an amount of electrostatic force to be applied to the second comb 206 can be determined by applying a test drive signal to the second comb 206 of the proof mass 202, but not to the first comb 206. Based on an indication of a position of the second comb 206 along a sense axis 208 with respect to a corresponding fourth drive comb 210, the amount of electrostatic force can then be determined. Accordingly, a different electrostatic force can be determined and applied to different combs 206 (e.g., the first and second) of the proof mass 202. In an example, the different electrostatic forces can be applied by applying different DC voltages to different pairs of electrodes (e.g., different pairs of sense electrodes).

In most examples, the above determination of electrostatic force to apply can be done during a calibration procedure as mentioned above with respect to FIG. 1. In some examples, the control circuit can implement a control loop to continually obtain, during operation, indications of the oscillation amplitude and continually apply, in real-time, electrostatic force to the proof mass 202 to adjust and maintain the proof mass comb 206 aligned with the drive comb 210.

In some examples (e.g., during factory calibration), different temperatures can be systematically applied, and indications of the oscillation amplitude can be obtained for the different temperatures. Accordingly, different electrostatic forces can be applied for different temperatures of operation.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for calibrating a micro-electro-mechanical system (MEMS) vibrating structure gyroscope, the method comprising:
obtaining an indication of a position of at least one proof mass with respect to at least one drive electrode; and
applying an electrostatic force to the at least one proof mass as a function of the indication, the electrostatic force configured to position the at least one proof mass in a first position with respect to at least one drive electrode, wherein the electrostatic force is configured to align at least one comb of the at least one proof mass with at least one comb of at least one drive electrode with respect to the sense axis.

2. The method of claim 1, wherein the electrostatic force is configured to adjust a position of the at least one proof mass along the sense axis with respect to a position of the at least one drive electrode.

3. The method of claim 1, wherein applying an electrostatic force includes applying a first direct current (DC) voltage to a first electrode opposing a first side of the at least one proof mass and a second DC voltage to a second electrode opposing a second side of the at least one proof mass based on the indication, wherein the first side and the second side of the at least one proof mass are orthogonal to a sense axis for the at least one proof mass.

4. The method of claim 3, wherein the first and second electrodes are configured to apply an electrostatic field to the at least one proof mass for sensing a Coriolis Effect in the at least one proof mass.

5. The method of claim 1, wherein obtaining an indication includes:
applying a test signal to the at least one drive electrode; and
measuring a capacitance between the at least one drive electrode and the at least one proof mass; and
wherein applying an electrostatic force includes applying an electrostatic force to the at least one proof mass as a function of the capacitance, the electrostatic force configured to position the at least one proof mass such that a first capacitance is achieved between the at least one drive electrode and the at least one proof mass when a test signal is applied.

6. The method of claim 5, wherein measuring a capacitance includes measuring an output from a charge amplifier coupled to the at least one proof mass.

7. The method of claim 5, wherein applying a test signal includes applying a signal configured to limit motion of the at least one proof mass.

8. The method of claim 1, wherein obtaining an indication includes performing a bias decomposition on bias present at the sense output in order to isolate a bias that is attributable to the disengagement of a proof mass comb with respect to a drive electrode comb.

9. The method of claim 1, comprising:
systematically applying different test electrostatic forces to the at least one proof mass;
obtaining indications corresponding to the different test electrostatic forces; and
selecting a first electrostatic force of the different test electrostatic forces as a function of the indications, wherein applying an electrostatic force includes applying the first electrostatic force.

10. The method of claim 9, wherein obtaining indications includes:
applying a test signal to the at least one drive electrode; and
measuring capacitances between the at least one drive electrode and the at least one proof mass to obtain a plurality of capacitances corresponding to the different test electrostatic forces; and
wherein selecting a first electrostatic force includes selecting an electrostatic force of the different test electrostatic forces corresponding to a largest capacitance of the plurality of capacitances.

11. The method of claim 10, wherein obtaining indications includes, for each test electrostatic force performing a bias decomposition on bias present at the sense output in order to isolate a bias that is attributable to the disengagement of a proof mass comb with respect to a drive electrode comb.

12. A vibratory structure gyroscope, the gyroscope comprising:
at least one proof mass having a first at least one comb, the at least one proof mass having a planar structure disposed orthogonal to a sense axis;
at least one drive electrode having a second at least one comb, the second at least one comb configured to engage the first at least one comb;
a first electrode opposing a first side of the at least one proof mass and a second electrode opposing a second side of the at least one proof mass, wherein the first side and second side of the at least one proof mass are orthogonal to the sense axis; and
a control circuit configured to:
apply a first direct current (DC) voltage to the first electrode and a second DC voltage to the second electrode in order to adjust a position along the sense axis of the at least one comb of the at least one proof mass with respect to a position along the sense axis of the at least one comb of the at least one drive electrode.

13. The vibratory structure gyroscope of claim 12, wherein the control circuit is configured to:
apply a test signal to the at least one drive electrode;
measure a capacitance between the at least one drive electrode and the at least one proof mass while the test signal is applied; and
apply DC voltages that are configured to align the at least one comb of the at least one proof mass with the at least one comb of the at least one drive electrode with respect to the sense axis.

14. The vibratory structure gyroscope of claim 12, wherein the first and second electrodes are configured to apply an electrostatic field to the at least one proof mass for sensing a Coriolis Effect in the at least one proof mass.

15. The vibratory structure gyroscope of claim 12, wherein the control circuit is configured to:
systematically apply different test DC voltages to the first and second electrodes;
measure capacitances between the at least one drive electrode and the at least one proof mass for the different test DC voltages;
select first DC voltages of the test DC voltages that corresponds to a largest capacitance measured; and
apply the first DC voltages to the first and second electrodes during operation.

16. The vibratory structure gyroscope of claim 12, wherein the at least one comb of the at least one proof mass corresponds to a first at least one comb and the at least one proof mass includes a second at least one comb;

wherein the at least one comb of the at least one drive electrode corresponds to a third at least one comb and the at least one drive electrode includes a fourth at least one comb configured to engage the second at least one comb of the at least one proof mass;

wherein the first and second electrodes are proximate the first and second at least one comb; and where the vibratory structure gyroscope includes a third electrode opposing a first side of the at least one proof mass and a fourth electrode opposing a second side of the at least one proof mass, the third and fourth electrode proximate the third and fourth at least one comb;

wherein the control circuit is configured to:

apply a first test signal to the first at least one comb;

measure a first capacitance between the at least one drive electrode and the at least one proof mass while the first test signal is applied;

apply a second test signal to the second at least one comb;

measure a second capacitance between the at least one drive electrode and the at least one proof mass while the second test signal is applied; and apply first DC voltages corresponding to the first capacitance to the first and second electrodes to adjust a position of the first comb; and apply second DC voltages corresponding to the second capacitance to the third and fourth electrodes to adjust a position of the third comb.

17. A method for calibrating a micro-electro-mechanical system (MEMS) vibrating structure gyroscope, the method comprising:

applying a test signal to at least one drive electrode;

systematically applying different test electrostatic forces to at least one proof mass;

measuring capacitances between the at least one drive electrode and the at least one proof mass to obtain a plurality of capacitances corresponding to the different test electrostatic forces;

selecting a first electrostatic force of the different electrostatic forces, the first electrostatic forces corresponding to a largest capacitance of the capacitances; and applying the first electrostatic force to the at least one proof mass during operation of the at least one proof mass.

18. The method of claim 17, wherein applying a first electrostatic force includes applying a first direct current (DC) voltage to a first electrode opposing a first side of the at least one proof mass and a second DC voltage to a second electrode opposing a second side of the at least one proof mass based on the indication, wherein the first side and the second side of the at least one proof mass are orthogonal to a sense axis for the at least one proof mass.

19. The method of claim 17, wherein the electrostatic force is configured to adjust a position of the at least one proof mass along the sense axis with respect to a position of the at least one drive electrode.

* * * * *